(12) United States Patent
O'Haire et al.

(10) Patent No.: US 11,851,789 B2
(45) Date of Patent: Dec. 26, 2023

(54) CIRCULARLY WOVEN SPORTS ARTICLE

(71) Applicant: adidas AG, Herzogenaurach (DE)

(72) Inventors: Tom O'Haire, Nuremberg (DE); Andrew Yip, Nuremberg (DE)

(73) Assignee: adidas AG, Herzogenaurach (DE)

( * ) Notice: Subject to any disclaimer, the term of this patent is extended or adjusted under 35 U.S.C. 154(b) by 210 days.

(21) Appl. No.: 16/534,625

(22) Filed: Aug. 7, 2019

(65) Prior Publication Data

US 2020/0048798 A1 Feb. 13, 2020

(30) Foreign Application Priority Data

Aug. 8, 2018 (DE) .......................... 102018213347.6

(51) Int. Cl.
*D03D 3/02* (2006.01)
*A43B 23/02* (2006.01)
(Continued)

(52) U.S. Cl.
CPC ............. *D03D 3/02* (2013.01); *A43B 23/026* (2013.01); *A43B 23/0235* (2013.01); *A43B 23/0245* (2013.01); *A43B 23/042* (2013.01); *A43D 11/00* (2013.01); *A43D 13/00* (2013.01); *B32B 5/024* (2013.01); *B32B 7/12* (2013.01); *B32B 27/12* (2013.01); *D03D 13/00* (2013.01); *D03D 15/292* (2021.01); *D03D 15/56* (2021.01); *B32B 2262/02* (2013.01); *B32B 2307/51* (2013.01); *B32B 2437/02* (2013.01); *D10B 2401/06* (2013.01); *D10B 2501/043* (2013.01)

(58) Field of Classification Search
CPC ..... A43B 23/00; A43B 23/02; A43B 23/0205; A43B 23/0245; A43B 23/0265; A43B 23/04; A43B 23/042; A43B 1/04; A43B 23/0235; A43B 23/026; D03D 3/02; D03D 13/00; D03D 15/292; D03D 15/56; A43D 11/00; A43D 13/00; B32B 5/024; B32B 7/12; B32B 27/12; B32B 2262/02; B32B 2307/51; B32B 2437/02; D10B 2401/06; D10B 2501/043
USPC ................... 442/208–216, 16, 182, 212–216
See application file for complete search history.

(56) References Cited

U.S. PATENT DOCUMENTS

| 2,325,977 A | 8/1943 | Robert et al. |
| 2014/0082905 A1 | 3/2014 | Wen |

(Continued)

FOREIGN PATENT DOCUMENTS

| CN | 106535688 A | 3/2017 |
| FR | 1298277 | 7/1962 |

(Continued)

OTHER PUBLICATIONS

Japanese Application No. 2019-145004, Office Action dated Aug. 24, 2021, 6 pages (English machine translation provided).

(Continued)

*Primary Examiner* — Matthew D Matzek
(74) *Attorney, Agent, or Firm* — Kilpatrick Townsend & Stockton LLP

(57) ABSTRACT

Described is a circularly-woven tube for an article of footwear or an article of apparel comprising: a plurality of warp yarns, having a first elastic modulus; a plurality of weft yarns, having a second elastic modulus, and wherein the second elastic modulus is smaller than the first elastic modulus.

20 Claims, 7 Drawing Sheets

(51) Int. Cl.
  *A43B 23/04* (2006.01)
  *A43D 11/00* (2006.01)
  *A43D 13/00* (2006.01)
  *B32B 5/02* (2006.01)
  *B32B 7/12* (2006.01)
  *B32B 27/12* (2006.01)
  *D03D 15/56* (2021.01)
  *D03D 13/00* (2006.01)
  *D03D 15/292* (2021.01)

(56) References Cited

U.S. PATENT DOCUMENTS

| | | | |
|---|---|---|---|
| 2014/0109286 A1* | 4/2014 | Blakely | A43B 23/0215 2/69 |
| 2014/0173934 A1* | 6/2014 | Bell | A43B 23/0265 36/84 |
| 2016/0345674 A1 | 12/2016 | Bruce et al. | |
| 2017/0181501 A1 | 6/2017 | Gautier et al. | |
| 2017/0233906 A1 | 8/2017 | Hwang | |

FOREIGN PATENT DOCUMENTS

| | | |
|---|---|---|
| JP | S55-025285 U | 6/1980 |
| JP | S57-068350 A | 4/1982 |
| JP | 3014355 U | 8/1995 |
| JP | 2017521187 A | 8/2017 |
| WO | 2017115805 A1 | 7/2017 |

OTHER PUBLICATIONS

German Patent Application No. 102018213347.6, First Office Action dated May 22, 2019, 5 pages (No English translation available. A summary of the Office Action is provided in the Transmittal Letter submitted herewith.).
Chinese Application No. 201910728729.3, Office Action dated Dec. 31, 2020, 23 pages (English machine translation provided).
Japanese Office Action Application No. 2019-145004, Office Action dated Nov. 4, 2020, 9 pages (English machine translation provided).
European Patent Application No. 19190739.3, Intent to Grant dated Jul. 6, 2021, 47 pages.
Chinese Patent Application No. 201910728729.3, Office Action dated Jun. 9, 2021, 7 pages (English machine translation provided).
European Patent Application No. 19190739.3, Extended Search Report dated Jan. 7, 2020, 10 pages.
Japanese Patent Application No. 2019-145004, Office Action, dated Aug. 9, 2022, 15 pages.

* cited by examiner

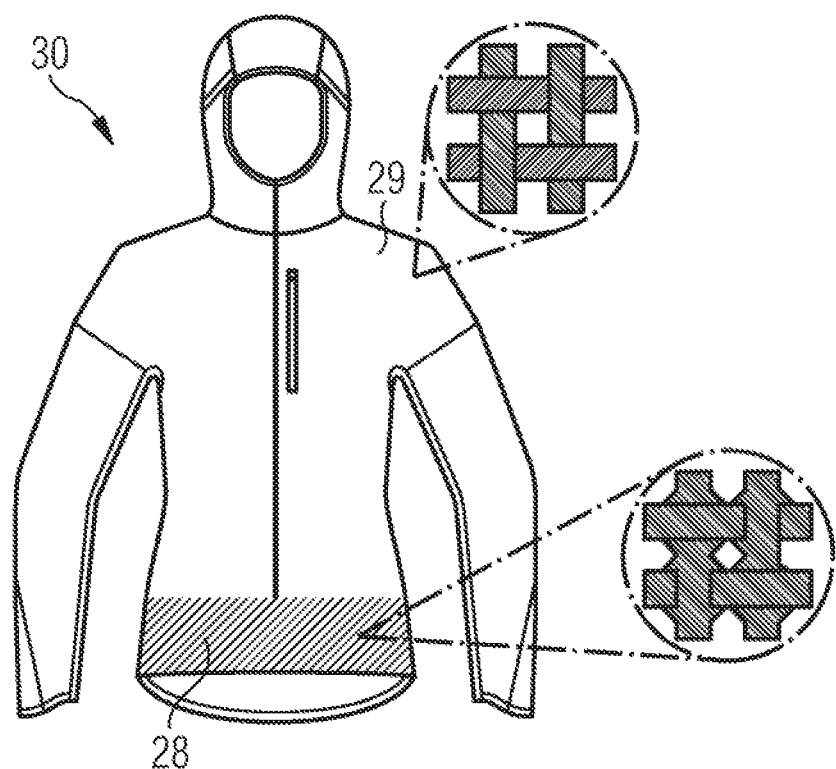

CIRCULARLY WOVEN SPORTS ARTICLE

CROSS REFERENCE TO RELATED APPLICATION

This application is related to and claims priority benefits from German Patent Application No. DE 10 2018 213 347.6, filed on Aug. 8, 2018, entitled CIRCULARLY WOVEN SPORTS ARTICLE ("the '347.6 application"). The '347.6 application is hereby incorporated herein in its entirety by this reference.

FIELD OF THE INVENTION

The present invention relates to an improved sports article and methods for production of the same.

BACKGROUND

Weaving is frequently used for producing textiles used in sports articles such as footwear or apparel because of the good stability, breathability, strength to weight ratio and abrasion resistance afforded by weaving. There are two broad types of weaving: flat weaving, in which the weft and the warp direction are oriented essentially in one plane and circular weaving, in which the weft direction is circular and the weft and warp yarns form an essentially cylindrical surface. During weaving, a warp yarn is generally held under a steady tension, in such a manner that some warp yarns are raised and others are lowered while a weft yarn is inserted in a direction substantially perpendicular to the warp yarns, for example by means of a shuttle. A circular weaving machine is a specific type of weaving machine in which the weft yarn is contained on shuttles which move in a circular motion, completing a full 360° turn.

Circular weaving has higher production speeds than flat weaving. Tubular textiles may be desirable for apparel, such as shirts or sleeves, or for footwear, for example a shoe upper. A flat woven textile would require additional processing steps such as cutting, stitching, moulding or a combination of these and other finishing methods. Stitching a flat woven textile may lead to a seam, for example by stitching two ends together, which could be uncomfortable especially during intense physical activity. However, the potential of circular weaving remains to be fully exploited. In particular, known circular woven tubes are still somewhat primitive and do not allow an optimal compromise of stability, fit, and comfort to be achieved.

US 2017/0233906 A1 concerns a seamless double layered porous woven structure that comprises a seamless circular inner layer structure and a porous outer layer structure. The outer layer structure is woven upon the seamless circular inner layer structure to provide a seamless double layered tubular structure, which is further gaited together with yarns at the edges of the double layered tubular structure. The inner layer structure is made by a circular weaving process while the outer layer structure is made by a warp weaving process. There are several porous regions and jacquard regions at the outer layer structure.

It is hence an aim underlying the present invention to provide a textile that enjoys some of the benefits of circular weaving but has an improved stability, fit, and comfort compared to circular woven textiles known in the art.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a circularly-woven tube for an article of footwear or an article of apparel comprises a plurality of warp yarns, having a first elastic modulus; a plurality of weft yarns, having a second elastic modulus, and wherein the second elastic modulus is smaller than the first elastic modulus.

In some embodiments, the circularly-woven tube is seamless.

In certain embodiments, the second elastic modulus is less than 1 GPa.

In some embodiments, a first type of the plurality of warp yarns is arranged in a first area and a second type of the plurality of warp yarns is arranged in a second area of the circularly-woven tube.

The first type of the plurality of warp yarns, in some embodiments, has a first bending stiffness and the second type of the plurality of warp yarns has a second bending stiffness, and the second bending stiffness is greater than the first bending stiffness.

At least one of the plurality of weft yarns or the plurality of warp yarns, in certain embodiments, comprises at least one of an aramid material, a ceramic, polyester, PET, nylon, cellulose, polypropylene, poly(butylene terephthalate), or elastane.

In some embodiments, at least one of the plurality of warp yarns or the plurality of weft yarns comprises a meltable component.

In certain embodiments, the plurality of warp yarns has a first elongation at break and the plurality of weft yarns has a second elongation at break, and wherein the second elongation at break is larger than the first elongation at break.

The second elongation at break, in some embodiments, is at least 100%.

In certain embodiments, the circularly-woven tube further comprises a film.

The film, in some embodiments, comprises a thermoplastic polymer.

According to certain embodiments of the present invention, a method of producing a shoe upper comprises producing a circularly-woven tube by circularly weaving a plurality of warp yarns having a first elastic modulus and a plurality of weft yarns having a second elastic modulus into a tubular shape; sealing a first end of the circularly-woven tube; and pulling the circularly-woven tube over a shoe last.

In certain embodiments, the method further comprises sealing a second end of the circularly-woven tube.

In some embodiments, the method further comprises attaching a midsole to the circularly-woven tube.

According to certain embodiments of the present invention, a shoe upper comprises at least a first layer, the first layer comprising a circularly-woven fabric.

In some embodiments, the shoe upper further comprises a midsole, which is attached to the first layer.

In certain embodiments, the shoe upper further comprises a second layer comprising a textile.

A midsole, in some embodiments, is arranged at least partly between the first and the second layer.

In some embodiments, the shoe upper further comprises an adhesive arranged at least partly between the first layer and the second layer.

The adhesive, in certain embodiments, comprises a meltable component.

BRIEF DESCRIPTION OF THE DRAWINGS

In the following detailed description, embodiments of the invention are described referring to the following figures:

FIG. 6 is a front view of an exemplary article of apparel according to certain embodiments of the present invention;

BRIEF DESCRIPTION

Figure 1A:
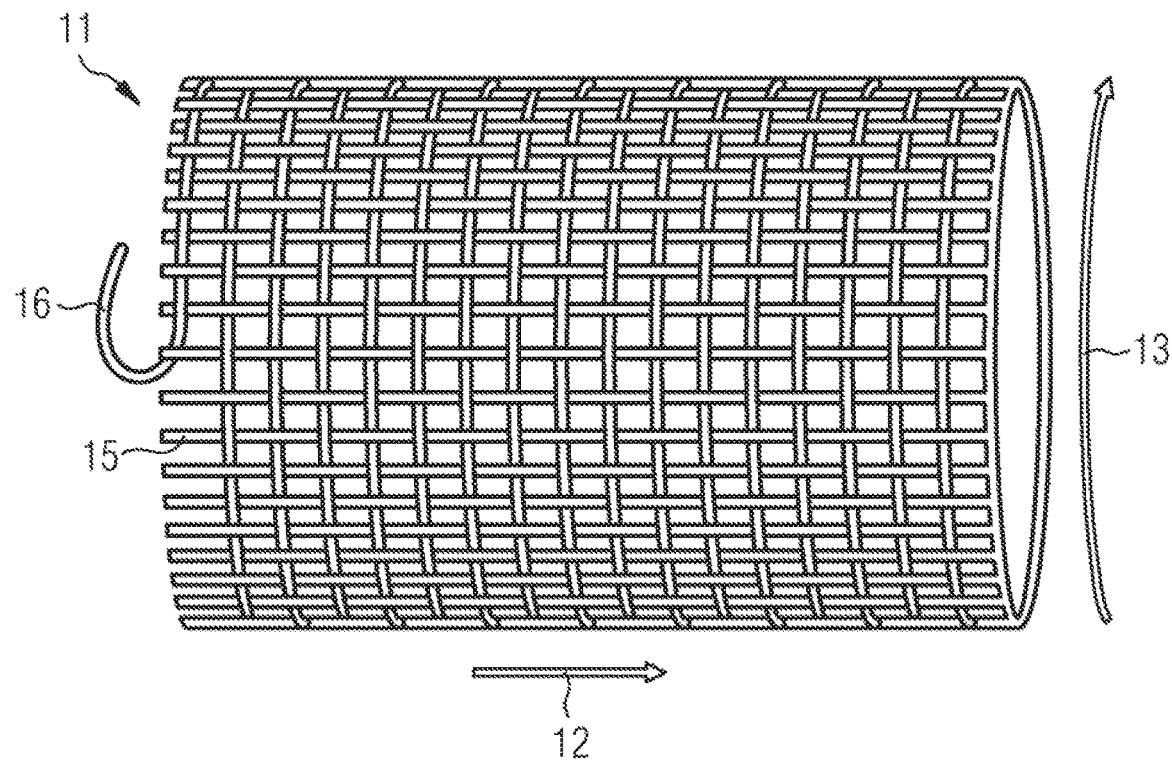
FIGS. 1A and 1B are side views of an exemplary circularly-woven tube according to certain embodiments of the present invention.

This object is accomplished by the teachings of the independent claims and in particular by a circularly-woven tube for an article of footwear or apparel comprising:

(a) a plurality of warp yarns, having a first elastic modulus; (b) a plurality of weft yarns, having a second elastic modulus, and (c) wherein the second elastic modulus is smaller than the first elastic modulus.

An article of footwear in the present context may be, but is not limited to, a shoe, for example a running shoe, a football boot, a tennis shoe, a golf shoe, etc. The circularly-woven tube may, for example, be for a shoe upper. An apparel in the present context may be, but is not limited to, sports apparel such as a shirt, a jersey, a sleeve, a sweatband, a pair of trousers, shorts, a sock, a compression or supporting bandage etc.

Circular-weaving allows a tube to be produced at higher speeds than with flat weaving. In the circularly-woven tube, the warp direction is essentially along a longitudinal direction of the tube and the weft direction is essentially along a circumferential, i.e. tangential, direction around the tube. A tube in the present context may be essentially cylindrical but allowing for unintentional deviations, for example due to manufacturing imperfections, as well as intentional deviations from a mathematically perfect cylinder. Therefore, "tube" in the context of the present disclosure is more understood in a topological sense. The diameter of the tube may be engineered to vary along a longitudinal direction of the tube depending, for example, on anatomic or athletic requirements. For example, a tube intended for a pair of shorts may have a larger diameter in a top portion than in the bottom portion. A tube intended for a shoe upper may have a larger diameter in a forefoot portion than in a heel portion, etc. A tube intended for a shoe upper may have a larger diameter at the mid-foot than at the toe or heel portions. A tube intended for a sock may have a larger diameter in a calf portion than in an ankle portion. A tube may be intended for a torso and may have a larger circumference in a chest portion than in a waist portion.

An aspect of the present disclosure is that the second elastic modulus is smaller than the first elastic modulus. The elastic modulus, also known as Young's modulus, is the ratio of tensile stress and extensional strain. A small second elastic modulus means that the material is "elastic" in a colloquial sense along the weft direction, i.e. a relatively small force, or tensile stress, is required to extend the circularly-woven tube along the weft direction. Therefore, the circularly-woven tube exhibits radial stretch. In other words, the smaller elastic modulus in the weft direction allows the circularly woven tube to stretch circumferentially. The radial stretch may achieve a comfortable fit. Since the first elastic modulus is larger than the second elastic modulus, the circularly-woven tube stretches less along a longitudinal direction than along a circumferential or radial direction. A large stretch along a longitudinal direction, compared with a radial direction, may lead to a poor or unstable fit. For example, a sock that is more elastic along a longitudinal direction than along a radial direction may tend to "pull itself off a wearer's foot". In contrast, a large stretch along a radial direction, by symmetry, does not lead to this effect. Therefore, the circularly-woven tube effects a sufficiently stable as well as comfortable fit.

The circularly-woven tube may be seamless. Circular weaving allows a seamless tube to be produced at high production speeds. It is to be understood that, in the present context, seamless means without a seam that results from stitching two ends of a flat woven textile together in order to produce a tube. The term "seamless" still applies to a circularly-woven tube with a woven seam, i.e. an interface resulting directly from weaving. Also, the tube may comprise additional seams which are not intended to provide the tube as such. For example, the tube may comprise a stitched seam to fix an additional element, such as a label or logo to the tube. A seam is often experienced as uncomfortable, especially during physical activity, and may lead to injuries and blisters.

The second elastic modulus may be less than 1 GPa. In some embodiments, the second elastic modulus may be less than 0.3 GPa. In further embodiments, the second elastic modulus may be less than 0.01 GPa. In still further embodiments, the second elastic modulus may be less than 0.03 GPa. This range of second elastic modulus allows a particularly comfortable fit to be achieved.

The first elastic modulus may be larger than the second elastic modulus by at least 50%, in some embodiments, by at least 100%. This ratio of first and second elastic modulus allows an optimal compromise between fit and stability to be achieved.

A first type of warp yarns may be arranged in a first area and a second type of warp yarns may be arranged in a second area of the circularly-woven tube. Therefore, it is possible to locally adjust the properties of the circularly-woven tube around its circumference. For example, an upper side of the circularly-woven tube may have different properties than a lower side of the circularly-woven tube. An upper side of the circularly-woven tube may be, for example, for a vamp portion of a shoe upper while a lower side of the circularly-woven tube may be for a portion of a bottom portion of a shoe upper.

The first type of warp yarns may have a first bending stiffness and the second type of warp yarns may have a second bending stiffness. In some embodiments, the second bending stiffness may be greater than the first bending stiffness. Therefore, the second area has a greater bending stiffness than the first area, thus effecting a greater stability of the second area than of the first area. For example, the second area may be for a bottom portion of a shoe upper and thus act to supplement a sole element or even to overcome the need for a sole element altogether. The first area may be for a vamp portion of the shoe upper and may be more flexible than the second area.

For example, a "strip" of very stiff yarns, placed adjacent to each other in the warp circle could create a region of "high stiffness" within a circularly-woven tube for a shoe. This may be particularly important for the production of integral hard components. For example, a footplate comprising carbon fiber, sometimes also known as graphite fiber, for a football boot could be created by using carbon yarns in a strip. This could then be formed into a composite with the local application of a resin or a thermoplastic polymer. The remaining warp yarns may comprise PET, nylon or similar textile grade materials.

Many combinations of warp yarns are possible. The warp yarns could be comprised of textile materials along with fusing or hot-melt yarns and/or materials such as carbon fiber, glass, Kevlar or Dyneema.

Similarly, a third type of weft yarns may be arranged in a third area and a fourth type of weft yarns may be arranged in a fourth area.

The third type of weft yarns may have a third bending stiffness and the fourth type of weft yarns may have a fourth bending stiffness, and the fourth bending stiffness may be greater than the third bending stiffness. Therefore, the fourth area has a greater bending stiffness than the third area, thus effecting a greater stability of the fourth area than of the third area. The fourth area may be arranged at least in a heel portion of a shoe upper, around a lace eyelet, in a toe portion, and/or in a lateral and/or medial side portion where stability is required and the third area may be a midfoot portion, where more flexibility is required for comfort and ease of inserting a foot.

At least one weft yarn and/or at least one warp yarn may comprise an aramid material, a ceramic, polyester, PET, nylon, cellulose, polypropylene, poly(butylene terephthalate), and/or elastane. For example, elastane may have an elastic modulus of between 0.002 and 0.01 GPa and an elongation at break of between 300% and 450%, thus allowing a great amount of stretch to be engineered into the circularly-woven tube. Nylon on the other hand has an elastic modulus of around 2-4 GPa, thus allowing great strength to be engineered into the circularly-woven tube. At least one weft yarn and/or at least one warp yarn may be formed of a tape extrusion or a thin textile product. For example, at least one warp and/or weft yarn could be formed of a narrow tape of any one of the materials listed above. In some embodiments, a narrow tape could be a 2.5 mm narrow woven tape. Alternatively, at least one warp yarn and/or at least one weft yarn could be formed of elastane covered by PET. This construction gives the yarn initial stretch while allowing the yarn to also bear high loads, as the covering bears increasing amounts of the load.

At least one warp yarn and/or one weft yarn may comprise a meltable component. A meltable component may comprise a thermoplastic polymer with a melting point of 200° C. or lower, or in some embodiments, 150° C. or lower. Melting the meltable component allows an easy and secure way of consolidating the structure of the circularly-woven tube. This is particularly important, if the circularly-woven tube is used for a shoe upper.

Any of the yarns may comprise a bi-component fiber, for example of sheath-core type. For example, a sheath may comprise a meltable component, while the core may comprise a component with a higher melting temperature than the sheath. A sheath-core type yarn may be included throughout the circularly-woven tube or selectively in specific areas.

Any of the yarns may comprise a braid, a ribbon, and/or a tape, for improved stability compared with a conventional yarn.

The plurality of warp yarns may have a first elongation at break and the plurality of weft yarns may have a second elongation at break, wherein the second elongation at break is larger than the first elongation at break. Elongation at break, in the present context, is understood as the maximum stretch that may be achieved before the material breaks. Therefore, the weft yarns may stretch significantly before breaking, thus allowing the circularly-woven tube to stretch circumferentially, or radially, to achieve an optimal fit.

The second elongation at break may be at least 100%, or in some embodiments, 150%. This range of elongation at break may allow a comfortable fit.

The circularly-woven tube may further comprise a film. The application of a film may act to consolidate the circularly-woven tube and increase its abrasion resistance. Moreover, the level of water resistance may be improved.

The film may be thin, for example less than 2 mm, in some embodiments less than 1 mm, thus allowing a sufficient degree of water resistance, yet keeping the weight of the shoe upper low. However, the film may be relatively thick, i.e. plate-like, for example at least 2 mm, in some embodiments at least 4 mm, in order to afford a sufficient amount of stability.

The film may comprise a thermoplastic polymer. The thermoplastic polymer may have a melting point of less than 200° C., or in some embodiments less than 150° C. Therefore, the film may be at least partially molten during the production process to allow consolidation of the article of footwear or apparel. The film may be applied as a patch, either manually or by a patch placement robot.

The film may be applied to cover all or only part of the article of footwear or apparel. For example, the film may be applied only to part of a shoe upper. For example, the film may be applied to a base portion of the shoe upper, a medial and/or a lateral side portion of the shoe upper and/or around the heel and/or toe portions of the shoe upper. The film may or may not extend to the full height of the upper and may or may not reach a foot opening. This way, in some embodiments, it is possible to locally select a level of support and protection. The applied film may provide local stiffening to the shoe upper where it is applied. The applied film may provide design or aesthetic improvements to the shoe upper. The film may be applied across the entire surface area of the shoe upper in order to improve functions such as weather resistance or soiling resistance. The film may have elastic properties. In this way stretch of the shoe upper is still permitted. The film may have no stretch properties and may prevent stretch of the shoe upper.

Certain embodiments of the invention further concern a shoe upper comprising a circularly-woven tube according to certain embodiments of the invention and as described herein. The circularly-woven tube according to certain embodiments of the present invention is particularly desirable for use as part of the shoe upper. A benefit of the circularly-woven tube according to certain embodiments of the present invention is that it may conform well to a shoe last. Minimal additional finishing steps may be required. Due to the low second elastic modulus, i.e. the "high elasticity" of the weft yarns, it may be possible to produce up to three different shoe sizes from just a circularly-woven tube of a given diameter. This greatly simplifies the production process. The higher first elastic modulus, compared to the second elastic modulus, ensures a sufficient amount of stability of the circularly-woven tube for use in a shoe upper.

The shoe upper may comprise a circularly-woven tube which comprises a film. For example, the film may be arranged on an upper side and/or a lateral side of the shoe upper and improve the degree of water resistance of the shoe upper. The film may additionally or alternatively be arranged on a lower side, for example a bottom portion, of the shoe upper and act to improve the stability of a bottom portion of the shoe upper, therefore supplementing the stability afforded by a sole element or avoiding the need for an additional sole element altogether.

The shoe upper may further comprise a midsole attached to the circularly-woven tube. The midsole may comprise polyurethane and/or ethyl vinyl acetate. A midsole may be attached to the shoe upper via infrared bonding (IR-bonding) or other methods of applying heat to melt the material of the midsole. The textile texture of the woven shoe upper provides a large surface area for the midsole to bond to and so provides stronger mechanical bonding than a traditional strobel. Further aspects of this feature are discussed below.

Certain embodiments of the invention further concern an article of footwear comprising a shoe upper according to certain embodiments of the present invention. The article of footwear thus has the beneficial properties of the shoe upper according to certain embodiments of the present invention as described herein.

An benefit of a shoe upper according to the present disclosure is its improved, stable, and comfortable fit. The shoe upper is more elastic along a radial direction than along a longitudinal direction and therefore conforms well to a foot while also providing a good fit without slipping off the foot or rubbing on the foot during physical exercise and movement.

Certain embodiments of the invention further concern an article of apparel comprising a circularly-woven tube according to certain embodiments of the present invention. The article of apparel thus has the beneficial properties of the circularly-woven tube according to certain embodiments of the present invention as described herein.

An benefit of an article of apparel according to the present disclosure is its improved, stable, and comfortable fit. Radial stretch can create radial compression in articles of apparel such as shorts or t-shirts or sleeves. Radial stretch can increase flexibility of a garment and allow for a greater range of movement for the wearer. For example, an article of apparel, such as a sleeve, that is more elastic along a longitudinal direction than along a radial direction may tend to contract on a wearer's arm leading to a poor fit. In contrast, a large stretch along a radial direction, by symmetry, does not lead to this effect but instead leads to a comfortable and stable fit.

Certain embodiments of the invention further concern a method of producing a circularly-woven tube for an article of footwear or apparel, comprising: (a) providing a plurality of warp yarns, having a first elastic modulus; (b) providing a plurality of weft yarns, having a second elastic modulus, (c) wherein the second elastic modulus is smaller than the first elastic modulus; (d) circularly weaving the plurality of warp yarns and the plurality of weft yarns into a tubular shape.

As described for the corresponding product, this method allows a circularly-woven tube that effects sufficient stability as well as a comfortable fit to be produced at high production speeds.

Circularly weaving the plurality of warp yarns and the plurality of weft yarns into a tubular shape may produce a seamless circularly-woven tube. Circular weaving allows a seamless tube to be produced at high production speeds. The benefits of a seamless tube and how the term "seamless" is to be understood, have already been outlined above.

The second elastic modulus may be less than 1 GPa. In some embodiments, the second elastic modulus may be less than 0.3 GPa. In further embodiments, the second elastic modulus may be less than 0.01 GPa. In still further embodiments, the second elastic modulus may be less than 0.03 GPa. This range of second elastic modulus allows a particularly comfortable fit to be achieved.

Circularly weaving may comprise arranging a first type of warp yarns in a first area and a second type of warp yarns in a second area of the circularly-woven tube. Therefore, it is possible to locally adjust the properties of the circularly-woven tube around its circumference. For example, an upper side of the circularly-woven tube may have different properties than a lower side of the circularly-woven tube. An upper side of the circularly-woven tube may be, for example, for a vamp portion of a shoe upper while a lower side of the circularly-woven tube may be for a portion of a bottom portion of a shoe upper.

The first type of warp yarns may have a first bending stiffness and the second type of warp yarns may have a second bending stiffness, and the second bending stiffness may be greater than the first bending stiffness. Therefore, the second area has a greater bending stiffness than the first area, thus effecting a greater stability of the second area than of the first area. For example, the second area may be for a bottom portion of a shoe upper and thus act to supplement a sole element or even to overcome the need for a sole element altogether. The first area may be for a vamp portion of the shoe upper may be more flexible than the second area.

Similarly, a third type of weft yarns may be arranged in a third area and a fourth type of weft yarns may be arranged in a fourth area.

The third type of weft yarns may have a third bending stiffness and the fourth type of weft yarns may have a fourth bending stiffness, and the fourth bending stiffness may be greater than the third bending stiffness. Therefore, the fourth area has a greater bending stiffness than the third area, thus effecting a greater stability of the fourth area than of the third area. The fourth area may be a heel portion of a shoe upper, where stability is required and the third area may be a midfoot portion, where more flexibility is required.

At least one weft yarn and/or at least one warp yarn may comprise an aramid material, a ceramic, polyester, PET, nylon, cellulose, polypropylene, poly(butylene terephthalate), and/or elastane. For example, elastane may have an elastic modulus of between 0.002 and 0.01 GPa and an elongation at break of between 300% and 450%, thus allowing a great amount of stretch to be engineered into the circularly-woven tube. Nylon on the other hand has an elastic modulus of around 2-4 GPa, thus allowing great strength to be engineering into the circularly-woven tube.

At least one warp yarn and/or one weft yarn may comprise a meltable component. A meltable component may comprise a thermoplastic polymer with a melting point of 200° C. or lower, or in some embodiments 150° C. or lower. Melting the meltable component allows an easy and secure way of consolidating the structure of the circularly-woven tube. This is particularly important, if the circularly-woven tube is used for a shoe upper.

Any of the yarns may comprise a bi-component fiber, for example of sheath-core type. For example, a sheath may comprise a meltable component, while the core may comprise a component with a higher melting temperature than the sheath.

The consolidation and fusing of the circularly-woven tube may be performed locally or across the whole tube. For local reinforcement, heat may be applied to specific areas using a hot iron. For local reinforcement, heat may be applied through infrared radiation. Heating may be performed as a manual process or through an automated process. To effect fusion across the whole tube, the fabric components may be treated in a hot-air oven or heated cell. If the circularly-woven tube is comprised in a shoe upper, any one of these processed may happen while the shoe upper is arranged on a last. Alternatively, local or global heating may be performed while the tube is positioned on a flat surface.

Any of the yarns may comprise a braid, a ribbon, and/or a tape, for improved stability compared with a conventional yarn.

The plurality of warp yarns may have a first elongation at break and the plurality of weft yarns may have a second elongation at break, wherein the second elongation at break is larger than the first elongation at break. Elongation at break, in the present context, is understood as the maximum stretch that may be achieved before the material breaks. Therefore, the weft yarns may stretch significantly before breaking, thus allowing the circularly-woven tube to stretch circumferentially, or radially, to achieve an optimal fit.

The second elongation at break may be at least 100%, in some embodiments 150%, and in further embodiments 200%. This range of elongation at break may allow a comfortable fit.

The method may further comprise sealing a first end and/or a second end of the circularly-woven tube and/or cutting an opening into the circularly-woven tube, as described elsewhere herein. Therefore, a greater range of geometries for a final product, such as an article of footwear or apparel may be achieved.

The method may further comprise cutting open the circularly-woven tube to produce a flat, two-dimensional circularly-woven fabric. This flat circularly-woven fabric may be produced much faster than a flat-woven fabric of the same size and woven with the same selection of yarns. The flat circularly-woven fabric may be further processed for producing an article of apparel or footwear. The faster production speeds come from the circular weaving method where multiple wefts are inserted in a single rotation of the machine's weaving action, as opposed to a flat weaving technique where the weft is inserted one by one per shedding motion.

Certain embodiments of the invention further concern a method of producing a shoe upper comprising: (a) producing a circularly-woven tube as described herein; (b) sealing one end of the circularly-woven tube; and (c) pulling the circularly-woven tube over a shoe last.

This method of producing a shoe upper is particularly desirable since the circularly-woven tube according to certain embodiments of the present invention may conform particularly well to a shoe last with minimal additional finishing. Thus, the complexity of the process is reduced and may, for example, allow automation of the method that would not be possible for methods known in the art. Due to the low second elastic modulus, i.e. the "high elasticity" of the weft yarns, it may be possible to produce up to three different shoe sizes from just a circularly-woven tube of a given diameter. This greatly simplifies the production process. The higher first elastic modulus, compared to the second elastic modulus, ensures a sufficient amount stability of the circularly-woven tube for use in a shoe upper.

Instead of a three-dimensional shoe last, it is also possible to use an essentially two-dimensional blade. "Essentially two-dimensional" means, in this context, that the height of the blade is significantly smaller than the width and/or length of the blade. This arrangement improves the placement of patches, for example of a film, onto a lasted shoe upper.

The method may further comprise, cutting the circularly-woven tube open to produce a flat, two-dimensional circularly-woven fabric. This fabric may then be pulled over a shoe last or a blade for producing a shoe upper. Additionally, the flat, cut-open, circularly woven fabric may be further cut into pattern pieces and assembled as per traditional shoe-making manufacturing methods.

The method may further comprise sealing a second end of the circularly-woven tube. By sealing a second end of the circularly-woven tube, the operation of lasting the shoe upper is greatly simplified, since the motion of the shoe upper is restricted. For example, the first end may be closed with a stitch or tape, the last is then inserted, and then the circularly-woven tube is pulled taught and manipulated so that the proper conformation is achieved. The second end can then be closed in a similar way by a stitch or a tape, all with the last still inside. Once the weave may then be set by some fusing, melting, reinforcing, or lamination step, the collar portion may be split open and the last may be removed. It is also possible that the first or the second end of the tube is split open again and that that end then serves as a foot opening.

The method may further comprise applying heat and/or pressure to consolidate the shoe upper. It is desirable to consolidate the shoe upper in order to prevent damage to the shoe upper during use, especially during intense physical exercise, to increase the stretch resistance of some areas to provide additional support, and to decrease water permeability in some areas.

The consolidation and fusing of the circularly-woven tube may be performed locally or across the whole tube. For local reinforcement, heat may be applied to specific areas using a hot iron or by welding, for example infrared welding or high-frequency welding. To effect fusion across the whole tube, the fabric components may be treated in a hot-air oven or a heated cell. If the circularly-woven tube is comprised in a shoe upper, any one of these processed may happen while the shoe upper is arranged on a last. Further elements, e.g. woven textiles, may be added, for example by sewing or stitching, to hide any of the sealed ends or to modify the size and shape of the opening. Additional consolidation methods may include vacuum lamination or vacuum forming using heat and a flexible membrane to conform to half of a 3D shape. Other possibilities including non-heat consolidation where adhesive elements are activated via ultrasonic or radio frequency sound waves are also contemplated.

The shoe last may be collapsible, for example by a hinge-operated mechanism. This is not limited to any specific embodiment. The method may further comprise removing the shoe last at least partially by collapsing the shoe last. This allows a simplified removal of the shoe last from the shoe upper.

The method may further comprise applying a film to the circularly-woven tube. It has already been described herein how the term "film" is to be understood and what benefits it offers. The film may be applied as patch, either manually or by a patch placement robot.

The film may comprise a thermoplastic polymer. The thermoplastic polymer may have a melting point of less than 200° C., or in some embodiments less than 150° C. Therefore, the film may be at least partially molten during the production process to allow consolidation of the shoe upper.

The film may be applied to the circularly-woven tube prior to arranging the tube on a last. For example, a patch may be easier to place in an automated process when the circularly-woven tube is flat. For example, the circularly-woven tube may be placed on a flat surface or an essentially-flat surface such as an essentially two-dimensional blade. In some embodiments, a blade may be used in applications where additional flat elements or tapes need to be applied to the surface of the shoe upper textile. The blade provides a much easier geometry for a human or a robot to apply decals or foils in near 2D for pressing in traditional heat presses. However, it is also possible that the film is applied when the circularly-woven tube, or a shoe upper comprising the circularly-woven tube is arranged on a last.

The film may be applied to cover all or only part of the article of footwear or apparel. For example, the film may be applied only to part of a shoe upper. For example, the film may be applied to a base portion of the shoe upper, a medial and/or a lateral side portion of the shoe upper and/or around the heel and/or toe portions of the shoe upper. The film may or may not extend to the full height of the upper and may or may not reach a foot opening. This way, in some embodiments, it is possible to locally select a level of support and protection.

The method of producing a shoe upper may further comprise attaching a midsole to the circularly-woven tube. The benefits thereof and further possible features are described herein with reference to a method of producing a shoe upper comprising circularly-weaving at least a first layer. It is to be understood, that any or all of the features described with reference to a shoe upper comprising at least the first layer, which comprises the circularly-woven fabric may also be features of the shoe upper comprising a circularly-woven tube as described herein.

Certain embodiments of the invention further concern a method of producing an article of footwear comprising: (a) producing a shoe upper according to a method of certain embodiments of the present invention; (b) attaching a sole element to the shoe upper. As described herein, the method of producing a shoe upper is particularly beneficial and an article of footwear thus has the desirable properties of the shoe upper according to certain embodiments of the present invention and described herein.

Certain embodiments of the invention further concern a shoe upper comprising at least a first layer, which comprises a circularly-woven fabric. As described already herein, circular weaving allows higher production speeds than flat weaving. Therefore, a shoe upper according to certain embodiments of the present invention may be produced faster than a shoe upper as known in the art. Tubular textiles are also beneficial for use in the manufacture of a shoe upper, since a flat woven textile of the sort currently used in the industry requires additional processing steps such as cutting, stitching, moulding or a combination of these and other finishing methods in order to form the three-dimensional shape required to cover the foot of a wearer. Therefore, a shoe upper comprising a circularly-woven fabric may be produced with fewer total assembly steps than when using two-dimensional fabrics and textiles.

The shoe upper may further comprise a midsole, which is attached to the first layer. In some embodiments, a midsole may have cushioning properties. In other words, the midsole and the shoe upper may form one integral unit. This way, the stability of an article of footwear comprising the shoe upper may be improved. The midsole may be configured such that it does not contact the ground during normal use. For example, the midsole may comprise randomly oriented particles of an expanded material, for example expanded polyurethane.

The shoe upper may further comprise a second layer comprising a textile. A textile in the present context may be warp knitted, weft knitted, flat woven, circularly woven, non-woven etc. The second layer further improves the stability of the shoe upper. Moreover, the first layer and the second layer may be engineered to provide different primary functions. Different techniques of producing a textile generally effect different properties. It may therefore be particularly desirable if the second layer is not a woven, such that the properties of the first and the second layer may complement each other in a desirable manner.

For example, if the second layer is on an inside of the shoe upper, the second layer may be configured to be particularly comfortable. For example, a second layer comprising a non-woven or a knit may be particularly soft and comfortable to touch. The second layer comprising a non-woven may also be lightweight and provide a good level of water resistance. The first layer comprising a circularly-woven fabric may then have the primary function of providing structural stability.

The midsole may be arranged at least partly between the first and the second layer. In other words, at least the portion of the midsole may be arranged in at least a portion of an interface between the first and the second layer in a "sandwich"-like configuration. This arrangement may be particularly desirable since a midsole may provide a comfortable level of cushioning. However, soft and cushioning materials tend to be relatively fragile. A sandwich-like configuration is therefore desirable as it protects the midsole.

The shoe upper may further comprise an adhesive arranged at least partly between the first layer and the second layer. The adhesive may serve to bond the first layer and the second layer together, therefore preventing unintentional movement of the layers relative to each other. The adhesive may additionally improve the level of water resistance of the shoe upper.

The adhesive may comprise a meltable component such as a hotmelt film. A meltable component may comprise a thermoplastic polymer with a melting point of 200° C. or lower, or in some embodiments 150° C. or lower. Melting the meltable component allows an easy and secure way of consolidating the structure of the shoe upper.

Alternatively, the adhesive may comprise a liquid adhesive. The liquid adhesive may be applied to the second layer by spraying or by hand or by any other suitable method.

Alternatively, the shoe upper comprises an adhesive incorporated into the yarns of one or both layers of the shoe upper. The adhesive may be activated by applying heat in order to create bonding between the layers. The adhesive may alternatively be activated by ultrasonic or radio frequency sound waves.

The first layer may be arranged at least partly on an outside of the second layer. The first layer may be arranged entirely within the second layer. A circularly-woven fabric offers a good level of abrasion resistance and structural stability. Therefore, it is beneficial to arrange the first layer at least partly on an outside of the second layer. In this configuration, the second layer may have the primary function of providing wearing comfort to the wearer, as described herein.

The article of footwear may further comprise an outsole. An outsole may be abrasion resistant and offers a good level of ground traction. Therefore, the durability of the article of footwear is improved, the foot is protected, for example from sharp items, and the risk of slipping is reduced. The outsole could be attached via traditional methods such as rubber vulcanization or glue, or the outsole could be directly injected into the form required, or any other suitable methods.

Certain embodiments of the invention further concern a method of producing a shoe upper comprising circularly weaving at least a first layer. The benefits of this method, in particular its higher production speed, are discussed above.

It is to be understood, that any or all aspects described with respect to the method of producing a circularly-woven tube may be combined with the method of producing a shoe upper.

The method may further comprise providing a midsole and attaching the midsole to the first layer. As explained herein, this way, the stability of an article of footwear comprising the shoe upper may be improved. This step may, for example, be performed when the shoe upper is arranged on a last, therefore allowing easy processing.

The method may further comprise producing a textile and incorporating a second layer comprising the textile into the shoe upper. It has already been described that the second layer further improves the stability of the shoe upper. Moreover, the first layer and the second layer may be engineered to provide different primary functions.

The method may further comprise arranging the midsole at least partly between the first and the second layer. As already explained, such a "sandwich"-like configuration is desirable as it protects the midsole. For example, the second layer could be arranged on a last, the midsole could then be attached to the second layer and the first layer could subsequently be attached to the midsole and the second layer.

The method may further comprise applying an adhesive at least partly between the first layer and the second layer. The adhesive may be applied by spraying or by manual application. The adhesive may serve to bond the first layer and the second layer together and may additionally improve the level of water resistance of the shoe upper.

The adhesive may comprise a meltable component and the method may further comprise melting the meltable component. Melting the meltable component allows an easy and secure way of consolidating the structure of the shoe upper.

The method may further comprise arranging the first layer at least partly on an outside of the second layer. As explained herein, this is beneficial since a circularly-woven fabric offers a good level of abrasion resistance and structural stability.

Certain embodiments of the invention further concern a method of producing an article of footwear comprising producing a shoe upper according to the preceding claim. The method is therefore faster than methods known in the art. Moreover, the article of footwear allows an improved level of comfort and stability.

The method of producing an article of footwear may further comprise attaching an outsole to the shoe upper. An outsole may be abrasion resistant and offers a good level of ground traction. Therefore, the durability of the article of footwear is improved, the foot is protected, for example from sharp items, and the risk of slipping is reduced.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

In the following, only some possible embodiments of the invention are described in detail. It is to be understood that these exemplary embodiments may be modified in a number of ways and combined with each other whenever compatible and that certain features may be omitted in so far as they appear dispensable.

Figure 1B:
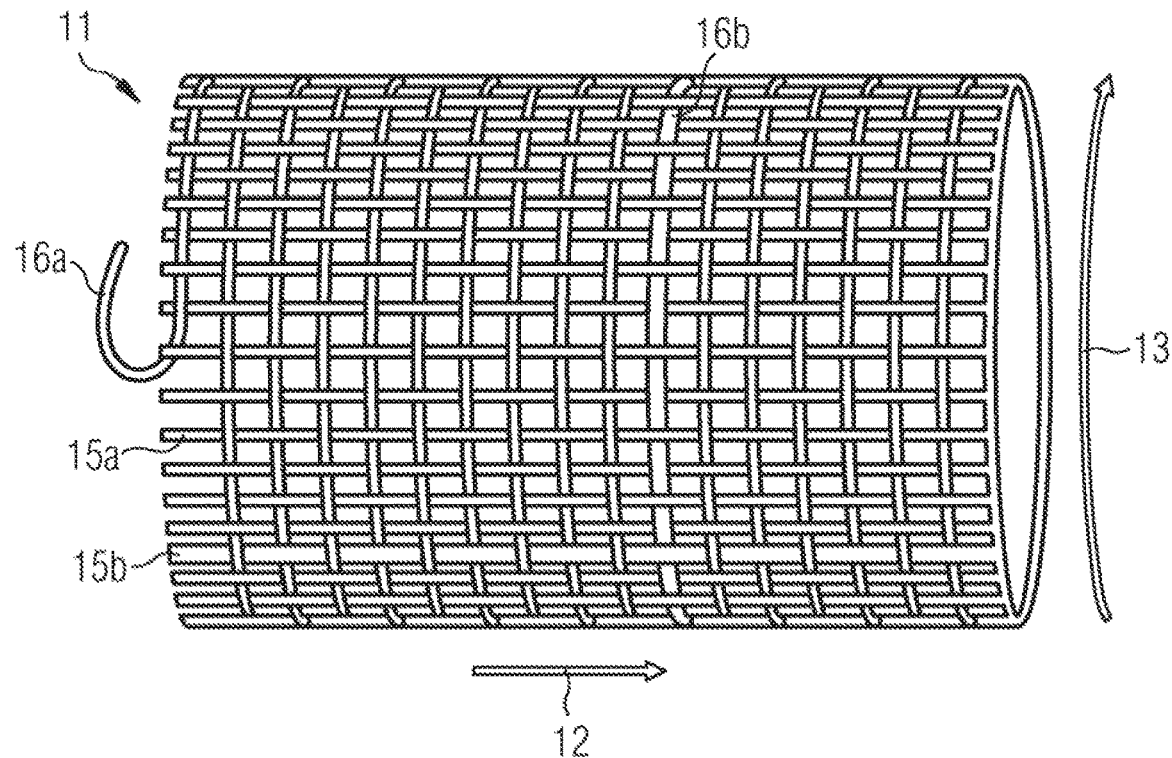

FIGS. 1A and 1B show an exemplary circularly-woven tube 11 in particular for an article of footwear or apparel, according to certain embodiments of the present invention. FIG. 1A illustrates the overall geometry and the arrangement of the warp 15 and weft 16 yarns.

The exemplary circularly-woven tube 11 comprises: (a) a plurality of warp yarns 15, having a first elastic modulus; (b) a plurality of weft yarns 16, having a second elastic modulus, and (c) wherein the second elastic modulus is smaller than the first elastic modulus.

In the circularly-woven tube 11, the warp direction 12 is essentially along a longitudinal direction of the tube and the weft direction 13 is essentially along a circumferential, i.e. tangential, direction around the tube. The tube is essentially cylindrical, allowing for unintentional deviations, due to manufacturing imperfections, as well as intentional deviations from a mathematically perfect cylinder.

Since the first elastic modulus is larger than the second elastic modulus, the circularly-woven tube 11 stretches less along a longitudinal direction than along a circumferential or radial direction. That is to say, the woven tube 11 stretches more in a radial direction than in a longitudinal direction. Therefore, the circularly-woven tube 11 effects sufficient stability as well as a comfortable fit. The woven tube 11 comprises a first open end and a second open end, opposing the first open end. The woven tube 11 is able to be pulled over the last of a shoe or a mannequin piece such as a male torso, a female torso or legs. Due to the weft yarns 16 having a low elastic modulus, the woven tube 11 can stretch radially over a last or mannequin piece.

The exemplary circularly-woven tube 11 is seamless in the sense that it does not comprise a sewn seam.

In some examples, the second elastic modulus is less than 0.01 GPa and the first elastic modulus is larger than the second elastic modulus by at least 100%.

In some examples, the weft yarns 16 comprise elastane and the warp yarns 15 comprise nylon. The warp yarns 15 and the weft yarns 16 comprise a meltable component comprising a thermoplastic polymer, in some examples thermoplastic polyurethane with a melting point less than of 200° C. In some examples, the warp 15 and weft 16 yarns comprises a bi-component of sheath-core type. The sheath comprises a meltable component, while the core comprises a component with a higher melting temperature than the sheath.

Though in some examples, the yarns do not comprise a braid, a ribbon, and/or a tape, generally any of the yarns may comprise a braid, a ribbon, and/or a tape, for improved stability compared with a conventional yarn.

In some examples, the plurality of warp yarns 15 has a first elongation at break and the plurality of weft yarns 16 has a second elongation at break, wherein the second elongation at break is larger than the first elongation at break. The second elongation at break is at least 100%.

FIG. 1B shows an alternative example of a circularly-woven tube 11. In some examples, a first type of warp yarns 15a is arranged in a first area and a second type of warp yarns 15b is arranged in a second area of the circularly-woven tube 11. The first type of warp yarns 15a has first bending stiffness and the second type of warp yarns 15b has a second bending stiffness, and the second bending stiffness is greater than the first bending stiffness. Therefore, the second area has a greater bending stiffness than the first area, thus effecting a greater stability of the second area than of the first area. In some examples, the second area is for a bottom portion of a shoe upper and thus acts to supplement a sole element or even to overcome the need for a sole element altogether. The first area is for a vamp portion of the shoe upper and may be more flexible than the second area.

Similarly, in some examples, a third type of weft yarns 16a is arranged in a third area and a fourth type of weft yarns 16b is arranged in a fourth area. The third type of weft yarns 16a has a third bending stiffness and the fourth type of weft yarns 16b has a fourth bending stiffness, and the fourth bending stiffness is greater than the third bending stiffness. Therefore, the fourth area has a greater bending stiffness than the third area, thus effecting a greater stability of the fourth area than of the third area. The fourth area may be a heel portion of a shoe upper, where stability is required and the third area may be a midfoot portion, where more flexibility is required.

Figure 2A:
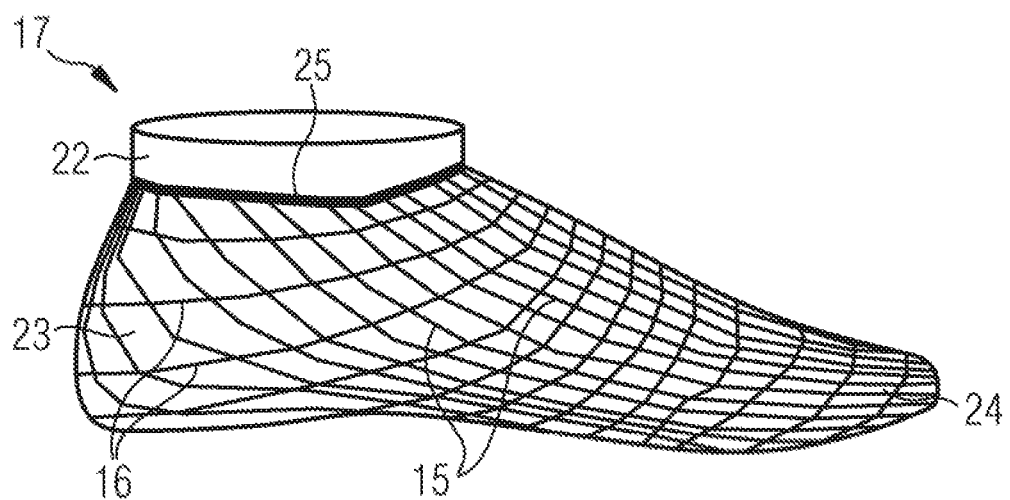
FIGS. 2A and 2B are side views of an exemplary partially completed shoe upper according to certain embodiments of the present invention.
Figure 2B:
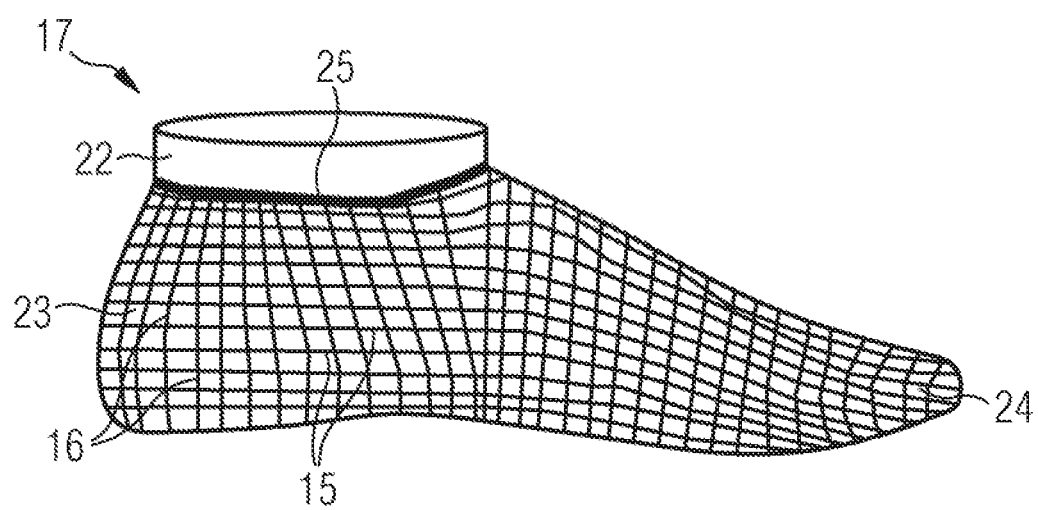

FIGS. 2A and 2B show another exemplary partially completed shoe upper 17 according to certain embodiments of the present invention.

The method of producing a shoe upper 17 comprises: (a) producing a circularly-woven tube as described herein; (b) sealing a first end 24 of the circularly-woven tube; and (c) pulling the circularly-woven tube over a shoe last 22. The first end 24 may be sealed prior to or after pulling the circularly-woven tube over the shoe last 22.

FIG. 2A shows an exemplary shoe upper 17 in which the circularly-woven tube is arranged with the warp yarns 15 extending from a collar opening 25 to a first end 24, in this case a toe portion 24. Therefore, the second end of the circularly-woven tube does not need to be sealed but instead serves as collar opening 25. The shoe upper 17 also includes weft yarns 16.

FIG. 2B shows an alternative exemplary shoe upper 17 in which the warp yarns 15 extend from a heel portion 23 to a toe portion 24. In this case, the exemplary method further comprises sealing a second end 23, in this case a heel portion 23, of the circularly-woven tube and cutting open a collar opening 25. The shoe upper 17 also includes weft yarns 16. The shoe last 22 is collapsible and the method further comprises removing the shoe last 22 at least partially by collapsing the shoe last 22 (step not shown). Removing the shoe last 22 comprises cutting an opening in a top area 25 of the shoe upper 17.

Figure 3A:
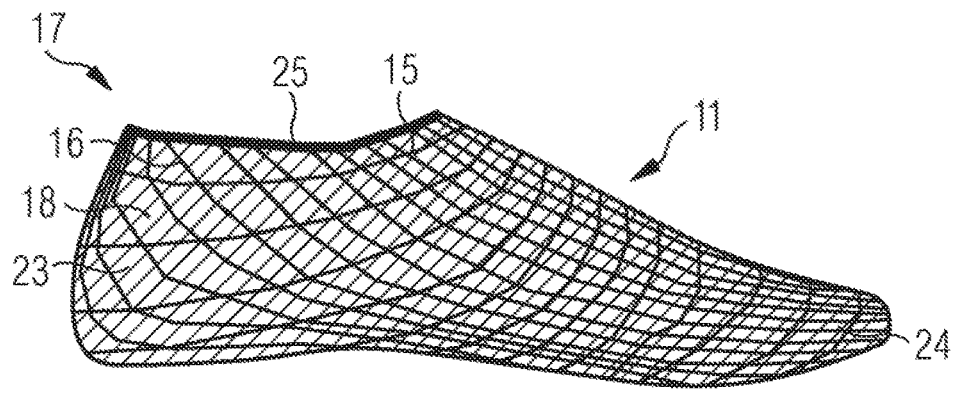
FIGS. 3A and 3B are side views of an exemplary partially completed shoe upper according to certain embodiments of the present invention.

FIG. 3A shows an exemplary partially-completed shoe upper 17 according to certain embodiments of the present invention. The shoe upper 17 comprises a circularly-woven tube according to certain embodiments of the present invention. In this exemplary shoe upper 17, the circularly-woven tube is arranged with the warp yarns 15 extending from a collar opening 25 to a first end 24, in this case a toe portion 24. The shoe upper 17 also includes weft yarns 16 and a heel portion 23. After circularly weaving a tube as described herein, a first end 24 of the circularly-woven tube is sealed in order to close or seal the woven tube. The opposing second end of the circularly woven tube forms a collar opening 25. In the example shown in FIG. 2A, the weft yarns are stretched around the heel 23 of the last to a greater extent than in the toe portion 24.

In a next step, or a previous step, a coating comprising a film 18 is applied to the circularly-woven tube 11 essentially covering an entire outer surface of the shoe upper 17. The film 18 may act to protect the shoe upper 17 and to improve its water resistance. The film 18 comprises a thermoplastic polymer with a melting point of less than 200° C. The film may be applied when the partially-completed shoe upper 17 is in a flat state after weaving and prior to lasting. It is also possible that the shoe upper 17 is arranged on a last and a film 18 is applied while the upper is arranged on the last.

Figure 3B:
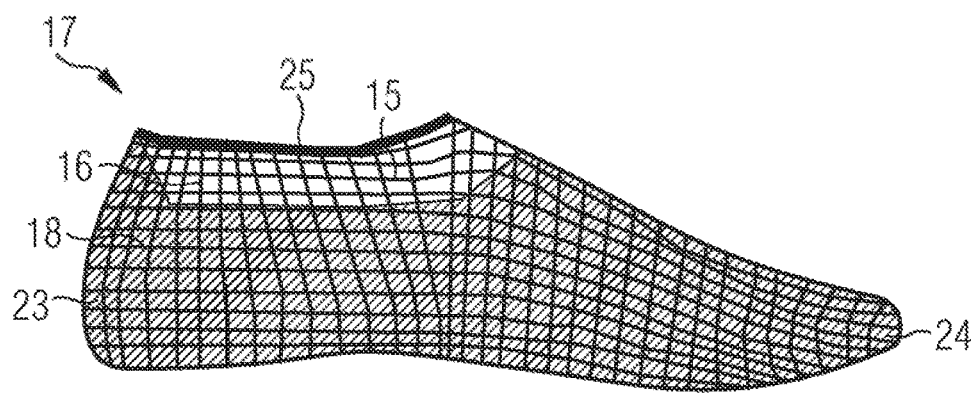

FIG. 3B shows an alternative example of an exemplary partially-completed shoe upper 17 according to certain embodiments of the present invention. In this exemplary shoe upper 17, the warp yarns 15 extend from a heel portion 23 to a toe portion 24. The shoe upper 17 also includes weft yarns 16. In this case, the exemplary method further comprises sealing a second end 23, in this case a heel portion 23, of the circularly-woven tube and cutting open a collar opening 25.

Moreover, in some examples, a coating comprising a film 18 has been applied only to part of the shoe upper 17. The coating in the example illustrated extends around the base of the upper, up each of the medial and lateral sides of the upper 17 and around the heel 23 and toe 24 portions of the upper. The coating does not extend to the full height of the upper 17 and does not reach the opening or top area 25.

Figure 4:
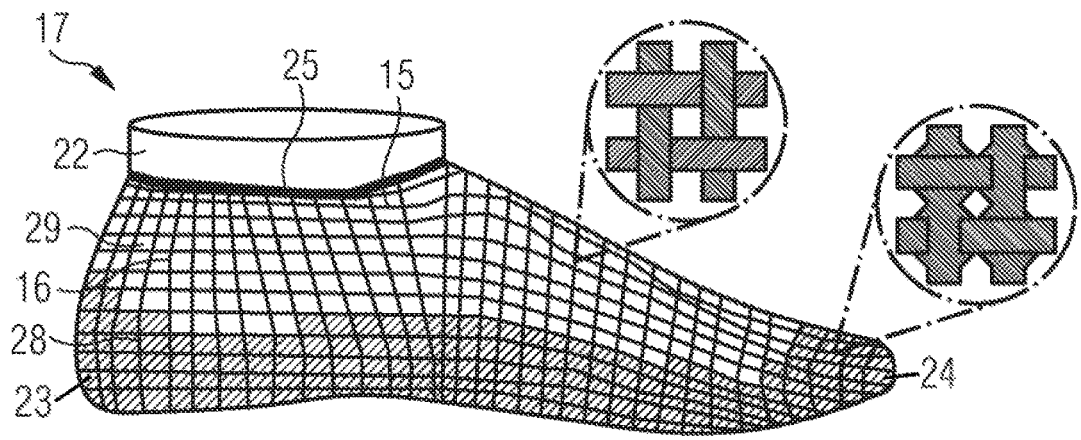
FIG. 4 is a side view of an exemplary partially completed shoe upper according to certain embodiments of the present invention.

FIG. 4 illustrates a method wherein heat and/or pressure are applied to a lasted shoe upper 17 while the upper is arranged on a last 22 in order to consolidate the shoe upper 17. In some examples, yarns comprising a (low-temperature) meltable component (which may also be referred to as melt yarn) were circularly woven into and fused in the fused portion 28, while a different type of yarn not comprising a (low-temperature) meltable component was circularly-woven into the non-fused portion 29. Applying heat at least partially melts the melt yarn as illustrated in the right part of the figure. In some examples, the melt yarn is a weft yarn 16. However, alternatively or additionally a warp yarn 15 may comprise a meltable component. In this case, the fused portion 28 is arranged in a bottom portion of the shoe upper 17, while the non-fused portion 29 is arranged in a top portion of the shoe upper 17.

Moreover, in this exemplary shoe upper 17, the warp yarns 15 extend from a heel portion 23 to a toe portion 24. In this case, the exemplary method further comprises sealing a second end 23, in this case a heel portion 23, of the circularly-woven tube and cutting open a collar opening 25.

Figure 5A:
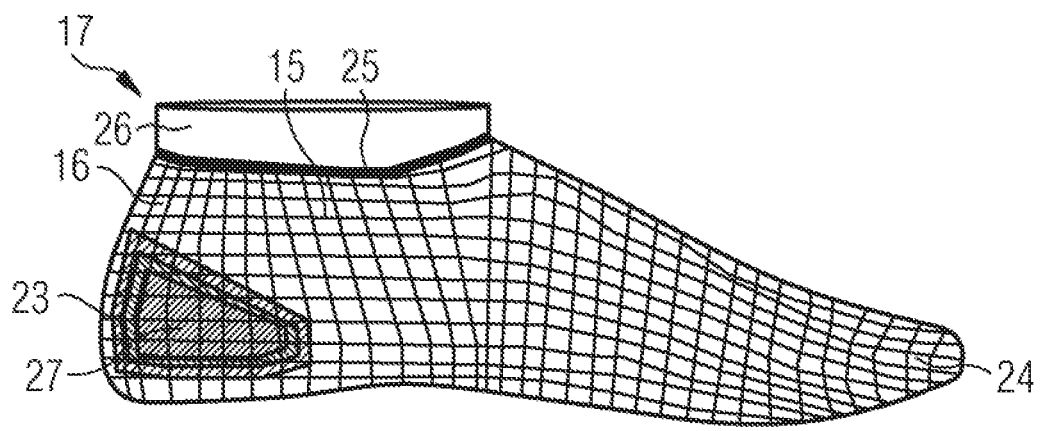
FIG. 5A and 5B are side views of an exemplary partially completed shoe upper according to certain embodiments of the present invention.
Figure 5B:
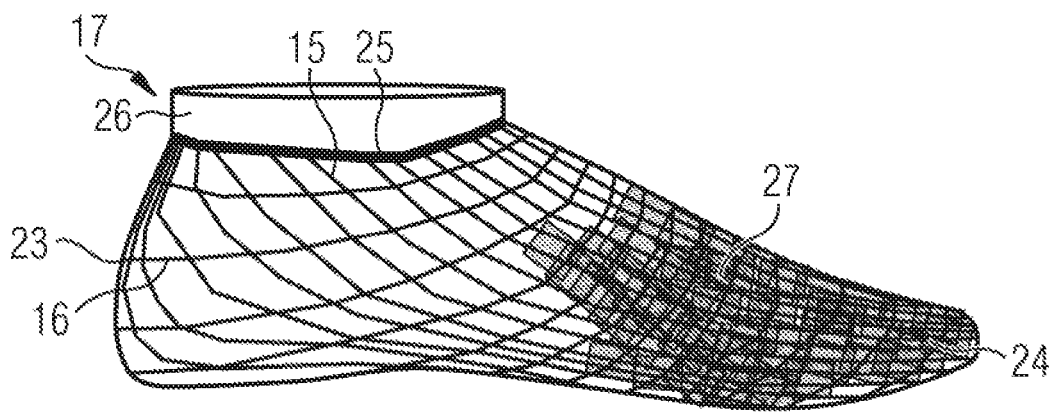

FIGS. 5A and 5B show an exemplary shoe upper 17 according to certain embodiments of the present invention arranged on a blade 26. The shoe upper 17 may include a plurality of warp yarns 15, a plurality of weft yarns 16 and may define a collar opening 25. The blade 26 is essentially two-dimensional, since its thickness is much smaller than its length, width or height This is indicated in the figure by a reduced cross-sectional area in comparison with the last 22 shown in FIGS. 2A, 2B, and 4. In some examples, the blade has a maximum thickness of less than 1 cm, whereas a last may have a maximum thickness of up to 10-15 cm, or more in some cases. The exemplary shoe upper 17 comprises a circularly woven tube according to certain embodiments of the present invention. The blade 26 is used to shape the shoe upper. FIG. 5A illustrates an example in which a number of patches have been applied in a stacked manner in a rear portion of the shoe upper 17. A base patch 27 is shown applied to the medial side of the heel of the upper 17. The base patch 27 has a trapezium shape in the sense that it is wider at the heel end 23 and narrower towards the toe end 24 of the upper 17. At the heel end 23 the base patch 27 extends more than halfway up the height of the upper 17. The base patch 27 has a higher stiffness than the circularly-woven tube. Therefore, the base patch 27 provides reinforcement and stability to the upper 17. Additional patches 27 are shown applied to the upper 17 on top of the base patch. Each additional patch 27 provides additional reinforcement to the upper 17.

FIG. 5B shows an example wherein the number of patches 27 have been applied in a mosaic, i.e. only partially overlapping manner in a front portion of the shoe upper 17. In some examples, the patches 27 have a rectangular shape. Each patch 27 has a higher stiffness than the circularly-woven tube. Because of this and because the thickness of the upper 17 is increased through the application of the patches 27, thus increasing the area moment of inertia of a cross-sectional area of the upper 17, the bending stiffness is increased by the application of the patches 27. The patches 27 have been applied to a toe portion 24 but not to a heel portion 23. Therefore, the shoe upper 17 has a higher bending stiffness in a toe portion 24 than in a heel portion 23 for a force applied locally perpendicular to the surface of the upper in a heel 23 or toe 24 portion.

In both examples, the patches 27 are applied while the shoe upper 17 is arranged on the blade 26, but it is also possible that the patches 27 are applied prior to arranging the shoe upper 17 on the blade 26. Since the blade 26 is essentially two-dimensional, the operation of placing patches 27 on the shoe upper 17 is greatly simplified and may be automated more easily.

FIG. 6 shows an exemplary article of apparel 30 according to certain embodiments of the present invention. The exemplary article of apparel 30 comprises a circularly woven tube according to certain embodiments of the present invention. In some examples, the article of apparel 30 is a sports jacket 30. The sports jacket 30 comprises a hood, two sleeves and a torso. In some examples, melt yarns were circularly woven into and fused in the fused portion 28, while a different type of yarn not comprising a (low-temperature) meltable component was circularly-woven into the non-fused portion 29. Applying heat at least partially melts the melt yarn as illustrated in the right part of the figure. Therefore, the fused portion 28 is more windproof than the non-fused portion 29. The apparel may further comprise a film, e.g. to improve the level of water resistance.

Figure 7:
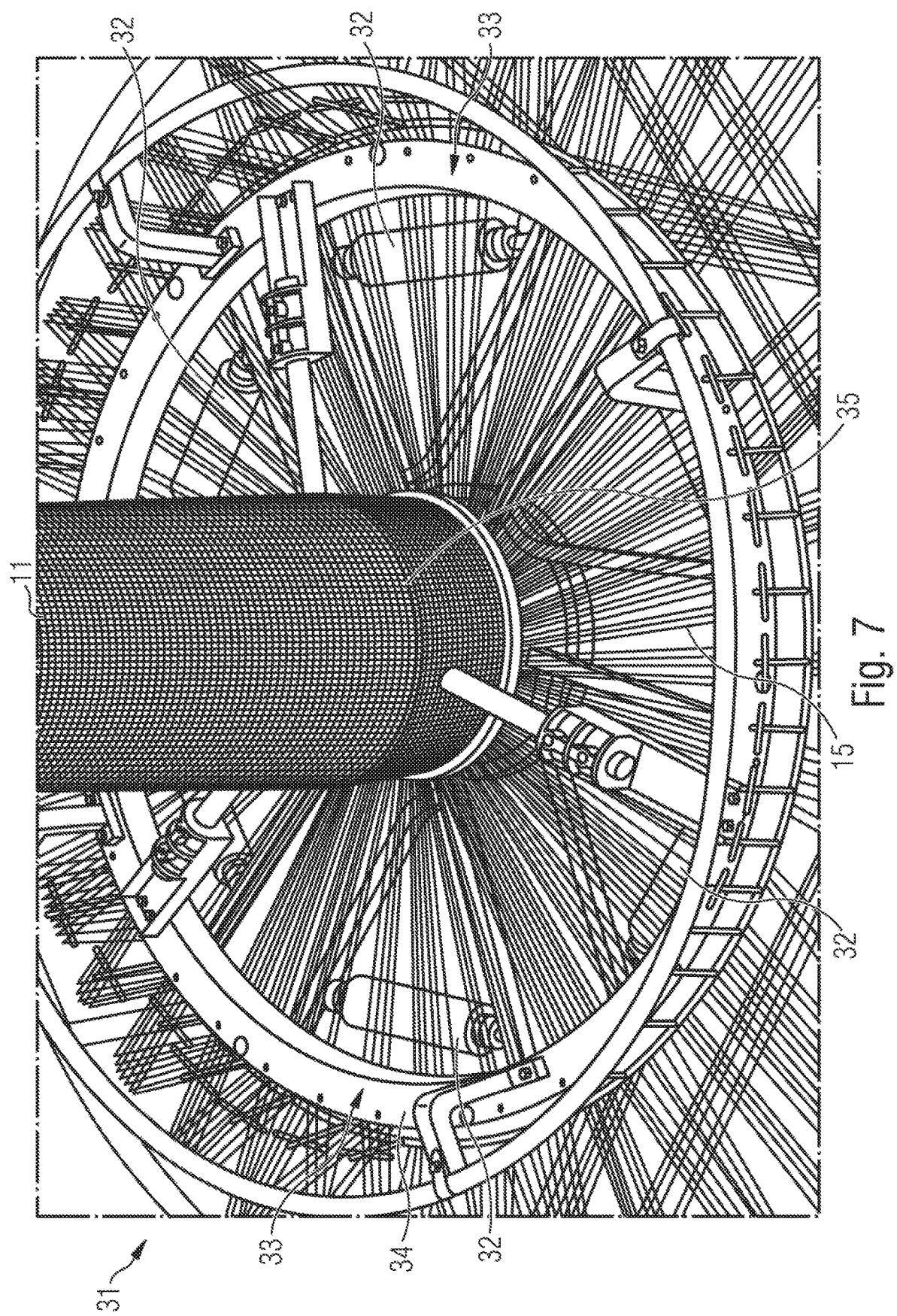
FIG. 7 is a top perspective view of an exemplary circular weaving machine suitable for a method according to certain embodiments of the present invention.

FIG. 7 shows an exemplary circular weaving machine 31, or loom, that is suitable for producing a circularly-woven tube 11 according to certain embodiments of the present invention.

Warp yarns 15 extend radially inwards towards the center. The weft yarns are supplied by bobbins 32 and are interwoven with the warp yarns 15 by a shuttle 33, arranged in a housing 34. In some examples, there are six shuttles 33. The shuttles 33 orbit the center of the circular weaving machine at high speed, allowing for a high weaving speed. The shuttles 33 cause a so-called "wave shed" motion where a shed is formed immediately in front of a moving shuttle 33 and closed behind it. This is achieved through the can tracks on the shuttle assembly, parting the threads as a pass-through, or by a synchronized electromechanical actuator, which allows for more freedom to control designs. A ring 35 is used for guiding the circularly-woven tube 11. The circularly-woven tube 11 is retrieved at the center of the machine 31.

Figure 8A:
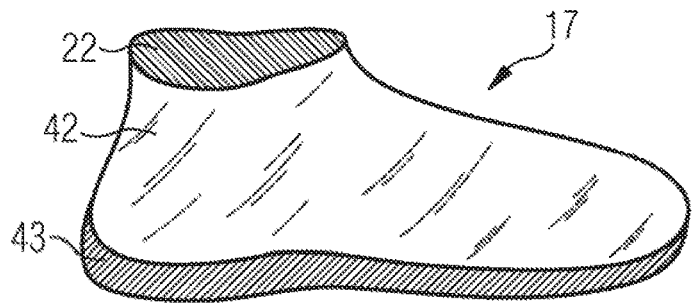
FIGS. 8A-C are side views of an exemplary shoe upper according to certain embodiments of the present invention.
Figure 8B:
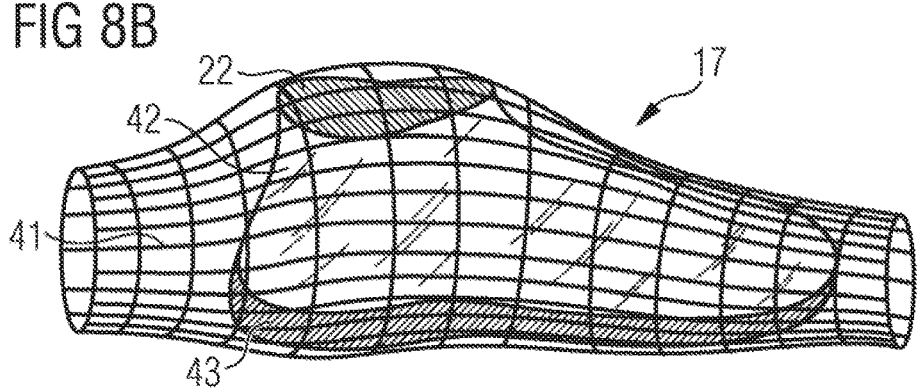
Figure 8C:
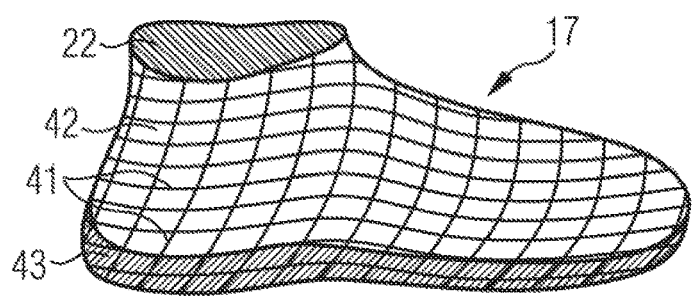

FIGS. 8A-C show an exemplary shoe upper according to certain embodiments of the present invention.

FIG. 8A shows a shoe upper 17, which is also shown in FIGS. 8B and 8C, comprising a second layer 42, which comprises a textile. The shoe upper is arranged on a last 22. A midsole 43 is attached to the second layer 42 by any suitable method. In some examples, the midsole 43 comprises randomly oriented particles of an expanded material comprising expanded polyurethane. An adhesive is applied to the midsole 43 and the second layer 42 combination.

In some examples, the textile comprises a woven fabric and in particular a circularly-woven fabric.

FIG. 8B illustrates a further step in the method for constructing a shoe with an integrated midsole. An adhesive layer is sprayed across the surface of the combined second layer 42 and midsole 43. Then a first layer 41, comprising a circularly-woven fabric, in some examples a circularly-woven tube, is pulled over the second layer 42 and the midsole 43 combination, while the second layer 42 is arranged on a last 22.

In some examples, the second layer 42 is on an inside of the shoe upper and is configured to be particularly comfortable by using soft and fine yarn. The first layer 41 has the primary function of providing structural stability and comprises stronger yarn than the second layer 42. In some examples, the midsole 43 is arranged at least partly between the first 41 and the second 42 layer in a "sandwich"-like configuration, as shown in FIG. 8C. FIG. 8C also shows the last 22. In further steps of the method, not shown, any excess portions of the first layer 41 are removed, and the construction is consolidated using heat and pressure.

Figure 9:
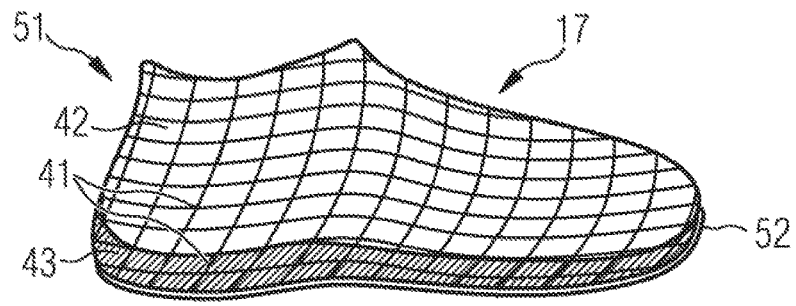
FIG. 9 is a side view of an exemplary shoe according to certain embodiments of the present invention.

FIG. 9 shows the shoe upper 17 of FIG. 8A-C, including the first layer 41, the second layer 42, and the midsole 43, further including an outsole 52 in order to produce shoe 51.

Reference Signs

11: circularly-woven tube
12: warp direction
13: weft direction
15: warp yarn
15a: first type of warp yarns
15b: second type of warp yarns
16: weft yarn
16a: third type of weft yarns 16b: fourth type of weft yarns
17: shoe upper
18: film
22: last
23: heel portion
24: toe portion
25: collar opening
26: blade
27: patch
28: fused portion
29: non-fused portions
30: article of apparel
31: circular weaving machine
32: bobbin
33: shuttle
34: housing
35: ring
41: first layer
42: second layer
43: midsole
51: shoe
52: outsole In the following, further examples are described to facilitate the understanding of the invention:

Example 1. A circularly-woven tube (11) for an article of footwear (51) or apparel (30) comprising:
(a) a plurality of warp yarns (15), having a first elastic modulus;
(b) a plurality of weft yarns (16), having a second elastic modulus, and
(c) wherein the second elastic modulus is smaller than the first elastic modulus.

Example 2. The circularly-woven tube (11) according to Example 1, wherein the circularly-woven tube (11) is seamless.

Example 3. The circularly-woven tube (11) according to one of the preceding Examples, wherein the second elastic modulus is less than 1 GPa.

Example 4. The circularly-woven tube (11) according to one of the preceding Examples, wherein a first type of warp yarns (15a) is arranged in a first area and a second type of warp yarns (15b) is arranged in a second area of the circularly-woven tube (11).

Example 5. The circularly-woven tube (11) according to the preceding Example, wherein the first type of warp yarns (15a) has a first bending stiffness and the second type of warp yarns (15b) has a second bending stiffness, and the second bending stiffness is greater than the first bending stiffness.

Example 6. The circularly-woven tube (11) according to one of the preceding Examples, wherein at least one weft yarn and/or at least one warp yarn comprises an aramid material, a ceramic, polyester, PET, nylon, cellulose, polypropylene, poly(butylene terephthalate), and/or elastane.

Example 7. The circularly-woven tube (11) according to one of the preceding Examples, wherein at least one warp yarn and/or one weft yarn comprises a meltable component.

Example 8. The circularly-woven tube (11) according to one of the preceding Examples, wherein the plurality of warp yarns (15) has a first elongation at break and the plurality of weft yarns (16) has a second elongation at break, and wherein the second elongation at break is larger than the first elongation at break.

Example 9. The circularly-woven tube (11) according to the preceding Example, wherein the second elongation at break is at least 100%.

Example 10. The circularly-woven tube (11) according to one of the preceding Examples, further comprising a film (18, 27).

Example 11. The circularly-woven tube (11) according to the preceding Example, wherein the film (18, 27) comprises a thermoplastic polymer.

Example 12. A shoe upper (17) comprising a circularly-woven tube (11) according to one of the preceding Examples.

Example 13. The shoe upper (17) according to the preceding Example, further comprising a midsole (43) attached to the circularly-woven tube (11).

Example 14. An article of footwear (51) comprising a shoe upper (17) according to one of Examples 10-13.

Example 15. An article of apparel (30) comprising a circularly-woven tube (11) according to one of Examples 1-11.

Example 16. A method of producing a circularly-woven tube (11) for an article of footwear (51) or apparel (30), comprising:
(a) providing a plurality of warp yarns (15), having a first elastic modulus;
(b) providing a plurality of weft yarns (16), having a second elastic modulus,
(c) wherein the second elastic modulus is smaller than the first elastic modulus;
(d) circularly weaving the plurality of warp yarns (15) and the plurality of weft yarns (16) into a tubular shape.

Example 17. The method of producing a circularly-woven tube (11) for an article of footwear (51) or apparel (30) according to the preceding Example, wherein circularly weaving the plurality of warp yarns (15) and the plurality of weft yarns (16) into a tubular shape produces a seamless circularly-woven tube (11).

Example 18. The method of producing a circularly-woven tube (11) for an article of footwear (51) or apparel (30) according to one of Examples 16 or 17, wherein the second elastic modulus is less than 1 GPa.

Example 19. The method of producing a circularly-woven tube (11) for an article of footwear (51) or apparel (30) according to one of Examples 16-18, wherein circularly weaving comprises arranging a first type of warp yarns (15a) in a first area and a second type of warp yarns (15b) in a second area of the circularly-woven tube (11).

Example 20. The method of producing a circularly-woven tube (11) for an article of footwear (51) or apparel (30) according to the preceding Example, wherein the first type of warp yarns (15a) has a first bending stiffness and the second type of warp yarns (15b) has a second bending stiffness, and the second bending stiffness is greater than the first bending stiffness.

Example 21. The method of producing a circularly-woven tube (11) for an article of footwear (51) or apparel (30) according to one of Examples 16-20, wherein at least one weft yarn and/or at least one warp yarn comprises an aramid material, a ceramic, polyester, PET, nylon, cellulose, polypropylene, poly(butylene terephthalate), and/or elastane.

Example 22. The method of producing a circularly-woven tube (11) for an article of footwear (51) or apparel (30) according to one of Examples 16-21, wherein at least one warp yarn and/or one weft yarn comprises a meltable component.

Example 23. The method of producing a circularly-woven tube (11) for an article of footwear (51) or apparel (30) according to one of Examples 16-22, wherein the plurality of warp yarns (15) has a first elongation at break and the plurality of weft yarns (16) has a second elongation at break, and wherein the second elongation at break is larger than the first elongation at break.

Example 24. The method of producing a circularly-woven tube (11) for an article of footwear (51) or apparel (30) according to the preceding Example, wherein the second elongation at break is at least 100%.

Example 25. The method of producing a circularly-woven tube (11) for an article of footwear (51) or apparel (30) according to one of Examples 16-24, further comprising applying a film (18, 27) to the circularly-woven tube (11).

Example 26. The method of producing a circularly-woven tube (11) for an article of footwear (51) or apparel (30) according to the preceding Example, wherein the film (18, 27) comprises a thermoplastic polymer.

Example 27. A method of producing a shoe upper (17) comprising:
(a) producing a circularly-woven tube (11) according to one of Examples 16-24;
(b) sealing a first end (24) of the circularly-woven tube (11);
(c) pulling the circularly-woven tube (11) over a shoe last.

Example 28. The method of producing a shoe upper (17) according to the preceding Example, further comprising sealing a second end (23) of the circularly-woven tube (11).

Example 29. The method of producing a shoe upper (17) according to according to one of Examples 27 or 28, further comprising attaching a midsole (43) to the circularly-woven tube (11).

Example 30. A method of producing an article of footwear (51) comprising:
(a) producing a shoe upper (17) according to one of Examples 27-29;
(b) attaching a sole element (52) to the shoe upper (17).

Example 31. A shoe upper (17) comprising at least a first layer, which comprises a circularly-woven fabric.

Example 32. A shoe upper (17) according to the preceding Example, further comprising a midsole (43), which is attached to the first layer.

Example 33. The shoe upper (17) according one of Examples 31 or 32, further comprising a second layer comprising a textile.

Example 34. The shoe upper (17) according to Example 32 and 33, wherein the midsole (43) is arranged at least partly between the first and the second layer.

Example 35. The shoe upper (17) according to the preceding Example, further comprising a adhesive arranged at least partly between the first layer and the second layer.

Example 36. The shoe upper (17) according to the preceding Example, wherein the adhesive comprises a meltable component.

Example 37. The shoe upper (17) according to one of Examples 33-36, wherein the first layer is arranged at least partly on an outside of the second layer.

Example 38. An article of footwear (51) comprising a shoe upper (17) according to the preceding Example.

Example 39. A method of producing a shoe upper (17) comprising circularly weaving at least a first layer.

Example 40. The method of producing a shoe upper (17) according to the preceding Example, further comprising providing a midsole (43) and attaching the midsole (43) to the first layer.

Example 41. The method of producing a shoe upper (17) according one of Examples 39 or 40, further comprising producing a textile and incorporating a second layer comprising the textile into the shoe upper (17).

Example 42. The method of producing a shoe upper (17) according to Example 40 and 41, further comprising arranging the midsole (43) at least partly between the first and the second layer.

Example 43. The method of producing a shoe upper (17) according to the preceding Example, further comprising applying an adhesive at least partly between the first layer and the second layer.

Example 44. The method of producing a shoe upper (17) according to the preceding Example, wherein the adhesive comprises a meltable component and the method further comprising melting the meltable component.

Example 45. The method of producing a shoe upper (17) according to one of Examples 41-44, further comprising arranging the first layer at least partly on an outside of the second layer.

Example 46. A method of producing an article of footwear (51) comprising producing a shoe upper (17) according to the preceding Example.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A circularly-woven tube for an article of footwear comprising:
a plurality of warp yarns, having a first elastic modulus;
a plurality of weft yarns, having a second elastic modulus, and
wherein the second elastic modulus is smaller than the first elastic modulus; and wherein a first type of warp yarns is arranged in a first area and a second type of warp yarns is arranged in a second area of the circularly-woven tube,
wherein the first type of warp yarns has a first bending stiffness and the second type of warp yarns has a second bending stiffness, and the second bending stiffness is greater than the first bending stiffness, and
wherein the first area is arranged in a vamp portion of an upper of the article of footwear and the second area is arranged in a bottom portion of the upper.

2. The circularly-woven tube according to claim 1, wherein the circularly-woven tube is seamless.

3. The circularly-woven tube according to claim 1, wherein at least one of least one weft yarn or at least one warp yarn comprises at least one of an aramid material, a ceramic, polyester, PET, nylon, cellulose, polypropylene, poly(butylene terephthalate), or elastane.

4. The circularly-woven tube according to claim 1, wherein at least one of at least one warp yarn or at least one weft yarn comprises a meltable component.

5. The circularly-woven tube according to claim 4, wherein the plurality of warp yarns has a first elongation at break and the plurality of weft yarns has a second elongation at break, and wherein the second elongation at break is larger than the first elongation at break.

6. The circularly-woven tube according to claim 5, wherein the second elongation at break is at least 100%.

7. The circularly-woven tube according to claim 1, further comprising a film.

8. The circularly-woven tube according to claim 7, wherein the film comprises a thermoplastic polymer.

9. A method of producing a circularly-woven tube for an article of footwear, comprising:
   providing a plurality of warp yarns, having a first elastic modulus;
   providing a plurality of weft yarns, having a second elastic modulus,
   wherein the second elastic modulus is smaller than the first elastic modulus;
   circularly weaving the plurality of warp yarns and the plurality of weft yarns into a tubular shape;
   wherein circularly weaving comprises arranging a first type of warp yarns in a first area and a second type of warp yarns in a second area of the circularly-woven tube,
   wherein the first type of warp yarns has a first bending stiffness and the second type of warp yarns has a second bending stiffness, and the second bending stiffness is greater than the first bending stiffness, and
   wherein the first area is arranged in a vamp portion of an upper of the article of footwear and the second area is arranged in a bottom portion of the upper.

10. The method of producing the circularly-woven tube for the article of footwear according to the claim 9, wherein circularly weaving the plurality of warp yarns and the plurality of weft yarns into the tubular shape produces a seamless circularly-woven tube.

11. The method of producing the circularly-woven tube for the article of footwear according to the claim 9, further comprising:
   sealing a first end of the circularly-woven tube; and
   pulling the circularly-woven tube over a shoe last.

12. The method of producing the circularly-woven tube for the article of footwear according to the claim 9, further comprising attaching a sole element to the upper.

13. The circularly-woven tube according to claim 1, wherein the second elastic modulus is less than 1 GPa.

14. The circularly-woven tube according to claim 1, wherein the first elastic modulus is at least 50% larger than the second elastic modulus.

15. The circularly-woven tube according to claim 1, wherein the plurality of weft yarns comprise elastane and the plurality of warp yarns comprise nylon.

16. The circularly-woven tube according to claim 1, wherein at least at least one of least one weft yarn or at least one warp yarn comprises elastane covered by PET.

17. The method of producing the circularly-woven tube for the article of footwear according to the claim 9, wherein the second elastic modulus is less than 1 GPa.

18. The method of producing the circularly-woven tube for the article of footwear according to the claim 9, wherein the first elastic modulus is at least 50% larger than the second elastic modulus.

19. The method of producing the circularly-woven tube for the article of footwear according to the claim 9, wherein the plurality of weft yarns comprise elastane and the plurality of warp yarns comprise nylon.

20. The method of producing the circularly-woven tube for the article of footwear according to the claim 9, wherein at least at least one of least one weft yarn or at least one warp yarn comprises elastane covered by PET.

* * * * *